United States Patent
Koncsek et al.

(10) Patent No.: US 6,634,595 B2
(45) Date of Patent: Oct. 21, 2003

(54) METHOD AND APPARATUS FOR CONTROLLING AIRCRAFT INLET AIR FLOW

(75) Inventors: Joseph L. Koncsek, Vashon, WA (US); Steven L. McMahon, Everett, WA (US); Myron L. Bultman, Sammamish, WA (US); Michael L. Sangwin, Lake Stevens, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/044,518

(22) Filed: Jan. 11, 2002

(65) Prior Publication Data

US 2003/0132342 A1 Jul. 17, 2003

(51) Int. Cl.[7] .............................................. B64D 33/02
(52) U.S. Cl. .................................. 244/53 B; 137/15.1
(58) Field of Search ............................... 244/53 B, 54, 244/55, 207, 208, 209; 137/15.1, 15.2

(56) References Cited

U.S. PATENT DOCUMENTS

| | | | | |
|---|---|---|---|---|
| 2,971,331 A | * | 2/1961 | Silverman et al. | 244/53 B |
| 3,430,640 A | * | 3/1969 | Lennard | 244/53 B |
| 3,578,265 A | | 5/1971 | Patierno et al. | |
| 3,664,612 A | | 5/1972 | Skidmore et al. | |
| 3,941,336 A | * | 3/1976 | Nagia | 244/53 B |
| 4,000,869 A | * | 1/1977 | Wong et al. | 244/53 B |
| 4,025,008 A | * | 5/1977 | Peikert | 244/53 B |
| 4,132,240 A | | 1/1979 | Frantz | |
| 4,314,341 A | | 2/1982 | Kivela | |
| 4,381,017 A | * | 4/1983 | Bissinger | 137/15.1 |
| 4,620,679 A | * | 11/1986 | Karanian | 244/53 B |
| 4,641,678 A | | 2/1987 | Haas et al. | |
| 4,865,268 A | | 9/1989 | Tracksdorf | |
| 5,078,341 A | | 1/1992 | Bichler et al. | |
| 5,490,644 A | | 2/1996 | Koncsek et al. | |

* cited by examiner

Primary Examiner—Galen L. Barefoot
(74) Attorney, Agent, or Firm—Perkins Coie LLP

(57) ABSTRACT

Methods and apparatus for controlling aircraft inlet air flow. The apparatus can include an external flow surface having a forward portion, and an engine inlet positioned at least proximate to the external flow surface and aft of the forward portion. The engine inlet can have an aperture and can be coupled with an engine inlet duct to an engine location. An auxiliary flow duct can be positioned at least proximate to the external flow surface and can include a first opening and a second opening spaced apart from the first opening. The first opening can be positioned to receive flow from the external flow surface during at least a first portion of an operating schedule of the propulsion system. The auxiliary flow duct can be configured to direct air to the engine location during at least a second portion of the operating schedule of the propulsion system. In one embodiment, boundary layer flow developed over the external flow surface can be diverted through the auxiliary flow duct, for example, during cruise operation, and auxiliary air flow can be provided to the engine through the auxiliary flow duct, for example, during takeoff operation.

83 Claims, 4 Drawing Sheets

METHOD AND APPARATUS FOR CONTROLLING AIRCRAFT INLET AIR FLOW

CROSS-REFERENCE TO RELATED APPLICATION

The present disclosure is related to the disclosure of pending U.S. patent application Ser. No. 09/815,390, filed Mar. 22, 2001 and incorporated herein in its entirety by reference.

BACKGROUND

The present invention relates generally to methods and apparatus for controlling the flow of air entering aircraft inlets. Conventional commercial jet aircraft are powered by axial flow turbine engines that receive free stream air through an inlet. The air is then compressed in a series of axial flow compressor stages. Fuel is added to the compressed air in a combuster and ignited, generating a stream of high-enthalpy exhaust products. The exhaust products pass through a turbine (which powers the compressor) and then exit the aircraft through an engine nozzle. The expelled exhaust products, typically in combination with compressed air that bypasses the combuster and turbine, impart thrust to the aircraft.

The efficiency of the aircraft engine is determined in part by the uniformity of the flow entering the compressor from the inlet. If the flow entering the compressor contains pockets of low speed air or is otherwise distorted, the compressor will not operate at its peak efficiency. If the distortion becomes too severe, the compressor can stall and can cause the engine to fail. Accordingly, it is desirable to provide air flow to the compressor with the highest possible uniformity.

One factor contributing to the non-uniformity of air entering the engine compressor is the presence of a boundary layer in the aircraft inlet. The boundary layer is a region of flow immediately adjacent to the surface of the inlet that has a substantial velocity gradient, and occurs because the air immediately adjacent to the inlet surface must have a zero velocity (otherwise an infinite shear force would be generated at the surface), while the air distant from the inlet surface has a high velocity.

One approach for reducing the effect of the boundary layer on aircraft engine inlets is to reduce the length of the wetted surface ahead of the engine. Accordingly, many commercial transport aircraft include engines that are mounted on pods spaced apart from the aircraft fuselage and wing surfaces to avoid ingesting the boundary layers that tend to build up on these surfaces. However, in some instances, it may be desirable to position the inlet adjacent to either the wing or the fuselage. In these instances, the boundary layer developing over the surface forward of the engine is typically removed, for example, by sucking the boundary layer flow away through a porous surface, by energizing the boundary layer flow with high speed air jets, or by ducting the flow away with a boundary layer diverter. Systems that remove the boundary layer through a porous surface or energize the boundary layer can be expensive, difficult to maintain, and/or difficult to control. Diverting the boundary layer through a boundary layer diverter can provide a more cost effective solution, but can also divert air flow that may be advantageous during certain stages of aircraft operation, such as static operation and take-off.

During static and take-off conditions, the engine is typically operated at a high thrust setting, but the forward speed of the aircraft is relatively low. Accordingly, the engine may be unable to obtain sufficient air from the stream tube directly ahead of the inlet and instead must draw additional air from around the sides of the inlet and around the inlet lip. If the inlet lip is too sharp, this flow can separate and can create distortion at the compressor. One approach to addressing this problem is to make the lip blunter. However, a drawback with this approach is that the blunt lip can increase aircraft drag at cruise speeds. Another approach to addressing this drawback is to provide auxiliary doors in the inlet that provide additional air during static and low speed operation. However, a drawback with the auxiliary doors is that they can increase the complexity of the inlet while providing functionality for only a small fraction of the time the inlet operates.

SUMMARY

The present invention is directed toward methods and apparatuses for controlling aircraft inlet air flow. A propulsion system in accordance with one aspect of the invention includes an external flow surface having a forward portion, and an engine inlet positioned at least proximate to the external flow surface and aft of the forward portion. The engine inlet can have an aperture positioned at least proximate to the external flow surface, and the system can further include an engine inlet duct extending aft from the aperture to an engine location. An auxiliary flow duct can be positioned at least proximate to the external flow surface, with the auxiliary flow duct having a first opening and a second opening spaced apart from the first opening. The first opening can be positioned to receive flow from the external flow surface during at least a first portion of an operating schedule of the propulsion system. The auxiliary flow duct can be configured to direct air to the engine location during at least a second portion of the operating schedule of the propulsion system.

In another aspect of the invention, the auxiliary flow duct can include a third opening between the first and second openings, with the third opening providing fluid communication between the auxiliary flow duct and the engine inlet duct. A valve, which can include a plurality of louvers, can regulate the flow of air through the third opening. In another aspect of the invention, a valve can be positioned at least proximate to the first opening of the auxiliary flow duct to control a flow of air through the first opening. In yet a further aspect of the invention, the external flow surface can include one of a lower wing surface and an upper wing surface, with the first opening of the auxiliary flow duct positioned proximate to the one wing surface and the second opening of the auxiliary flow duct positioned proximate to the other wing surface.

The invention is also directed to a method for controlling aircraft air flow. In one aspect of the invention, the method can include directing a first flow of air into an aircraft inlet aperture positioned proximate to an external flow surface of the aircraft and aft of a forward portion of the external surface. The method can further include directing the first flow through an engine inlet duct to an aircraft engine, receiving a second flow of air, including boundary area layer developed over the external flow surface, through a first opening of an auxiliary flow duct, and exiting at least a portion of the second flow of air from the auxiliary flow duct through a second opening of the auxiliary flow duct. The method can further include directing a third flow of air into the auxiliary flow duct, then from the auxiliary flow duct to the aircraft engine. In another aspect of the invention, the auxiliary flow duct can be a first auxiliary flow duct, and the method can further include directing a fourth flow of air through a second auxiliary flow duct to the aircraft engine.

DETAILED DESCRIPTION

The present disclosure describes methods and apparatuses for controlling the flow of air into jet aircraft inlets. Many specific details of certain embodiments of the invention are set forth in the following description and in FIGS. 1–9 to provide a thorough understanding of these embodiments. One skilled in the art, however, will understand that the present invention may have additional embodiments, and that the invention may be practiced without several of the details described below.

Figure 1:
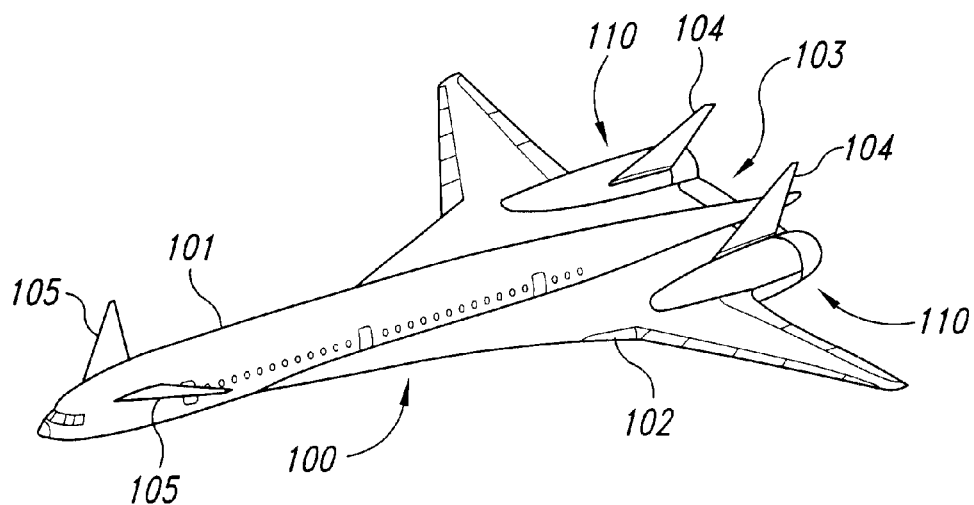
FIG. 1 is a top isometric view of an aircraft having a propulsion system and inlet in accordance with an embodiment of the invention.

FIG. 1 is a top isometric view of an aircraft 100 having dual propulsion systems 110 in accordance with an embodiment of the invention. In one aspect of this embodiment, the aircraft 100 can include a fuselage 101, a delta wing 102 and an aft body 103. The propulsion systems 110 can be integrated with the wing 102 and/or the aft body 103. The aircraft 100 can further include inwardly canted tails 104 and canards 105 for lateral and pitch axis control. In other embodiments, the aircraft can have other arrangements, such as those disclosed in pending U.S. patent application Ser. No. 09/815,390, incorporated herein by reference. In still further embodiments, the aircraft 100 can have other configurations.

Figure 2:
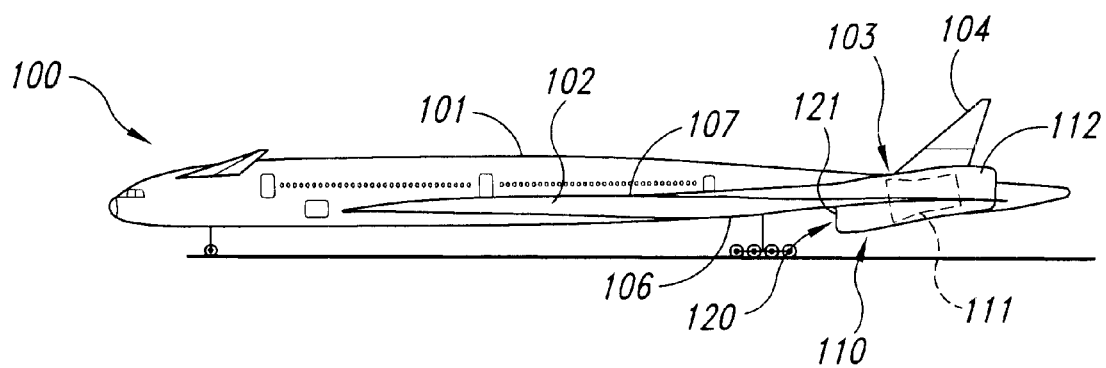
FIG. 2 is a side elevation view of an embodiment of the aircraft shown in FIG. 1.

FIG. 2 is a side elevation view of the aircraft 100 described above with reference to FIG. 1 in accordance with an embodiment of the invention. In one aspect of this embodiment, each propulsion system 110 can include an inlet 120 having an inlet aperture 121 that provides airflow to a turbine engine 111. The engine 111 can direct combustion exhaust products through an exhaust duct 112. In a further aspect of this embodiment, the inlet 120 can be positioned proximate to a lower surface 106 of the wing 102. Alternatively, the inlet 120 can be positioned proximate to an upper surface 107 of the wing. In either of these embodiments, the propulsion system 110 can have a generally S-shaped arrangement so that at least a portion of the propulsion system 110 is positioned between the lower surface 106 and the upper surface 107 of the wing 102. In a further alternate embodiment, the inlet 120 can be positioned proximate to the fuselage 101 of the aircraft 100. In any of the foregoing embodiments, the aircraft 100 can include an external flow surface forward of the inlet 120 over which a boundary layer may develop during operation.

Figure 3:
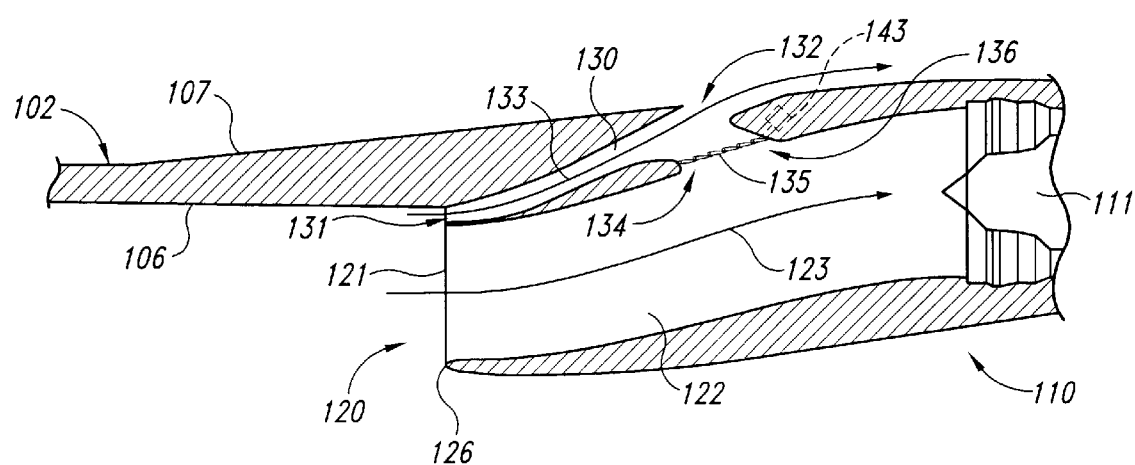
FIG. 3 is a partially schematic, cross-sectional side view of a propulsion system having an auxiliary flow duct operating as a boundary layer diverter in accordance with an embodiment of the invention.

FIG. 3 is a partially schematic, cross-sectional side view of the propulsion system 110 in accordance with an embodiment of the invention. In one aspect of this embodiment, the inlet aperture 121 can have an inlet lip 126. An engine inlet duct 122 can extend aft of the inlet aperture 121 and can be coupled in fluid communication with the engine 111 to provide engine air flow 123. In a further aspect of this embodiment, the inlet 120 can include an auxiliary flow duct 130 positioned in part between the inlet aperture 121 and the lower surface 106 of the wing 102. The auxiliary flow duct 130 can include a first opening 131 positioned proximate to the wing lower surface 106, and a second opening 132 positioned proximate to the wing upper surface 107. Alternatively, the first and second openings 131, 132 can have other locations. For example, both the first opening 131 and the second opening 132 can be positioned proximate to the same wing surface (such as the wing lower surface 106 or the wing upper surface 107).

The auxiliary flow duct 130 can further include a third opening 136 positioned to selectively place the auxiliary flow duct 130 in direct fluid communication with the engine inlet duct 122. A diverter valve 134 positioned in or proximate to the third opening 136 can control the flow of air through the third opening 136. In one embodiment, the diverter valve 134 can include louvers 135, and in other embodiments, the diverter valve 134 can include other valve arrangements. In any of these embodiments, the diverter valve 134 can be changeable from a first or closed configuration shown in FIG. 3 to a second or open configuration described below with reference to FIG. 4. In the first configuration, the diverter valve 134 can at least restrict the flow of air from the auxiliary flow duct 130 to the engine inlet duct 122. In the second or open configuration, the diverter valve 134 can allow at least a portion of the air in the auxiliary flow duct 130 to pass into the engine inlet duct 122.

During some phases of operation (for example, during cruise at high subsonic Mach numbers of 0.95 and above, cruise at supersonic Mach numbers, such as from about Mach 1.1 to about Mach 1.2, or during descent), the diverter valve 134 can be closed, as shown in FIG. 3. With the diverter valve 134 closed, diverted air flow 133 (which can include boundary layer air developed over the wing lower surface 106 forward of the inlet 120) can pass into the auxiliary flow duct 130 through the first opening 131 and pass out of the auxiliary flow duct 130 through the second opening 132. The diverted air flow 133, which may be highly distorted due to the presence of the boundary layer, can be directed away from the engine 111. The engine air flow 123 can accordingly be relatively uniform and non-distorted.

Figure 4:
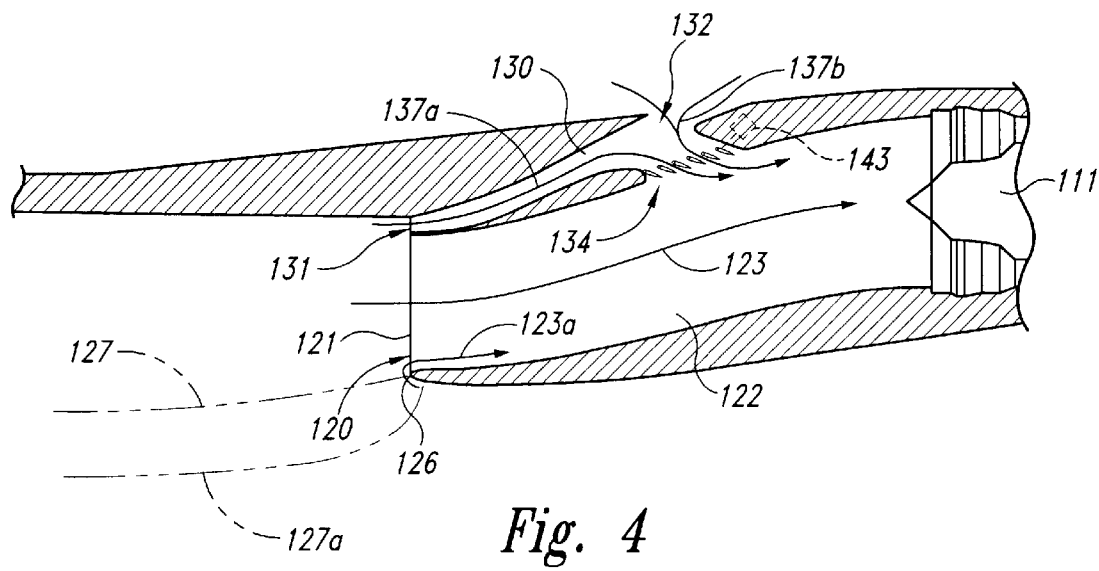
FIG. 4 is a partially schematic, cross-sectional side view of the propulsion system shown in FIG. 3 with the auxiliary flow duct operating to provide auxiliary air to an engine in accordance with another embodiment of the invention.

FIG. 4 illustrates the propulsion system 110 with the diverter valve 134 opened to allow fluid communication between the auxiliary flow duct 130 and the engine 111. In one embodiment, the diverter valve 134 can be opened during static and low speed operation, when the free stream velocity of the air external to the propulsion system 110 is low and the air requirements for the engine 111 are high. Such conditions can occur, for example, when the engine 111 is initially brought to full throttle at the end of the runway, and during the take-off roll. When the diverter valve 134 is opened, at least some of the air received by the engine can enter through the auxiliary flow duct 130, indicated by auxiliary air flows 137 (shown as a first auxiliary air flow 137a entering the first opening 131 of the auxiliary flow duct 130, and a second auxiliary air flow 137b entering the second opening 132). Accordingly, the relative amount of air provided to engine 111 through the inlet aperture 121 can be reduced. As a result, the lip 126 of the inlet 120 can be aerodynamically unloaded. For example, a stream tube 127 of air drawn through the inlet aperture 121 can extend generally axially forward of the inlet 120, and more of the air in the stream tube 127 can be drawn directly axially into the inlet aperture 121. Without the additional air provided by the auxiliary flow duct 130, the air supplied to the engine 111 during low speed, high thrust conditions may be drawn sharply around the inlet lip 126 (as indicated by stream tube 127a and engine air flow 123a). Accordingly, the auxiliary flow duct 130 can provide a flow of air in the engine inlet duct 122 that is less likely to separate and has increased uniformity when it arrives at the engine 111.

In one aspect of the foregoing embodiments described above with reference to FIGS. 3 and 4, the diverter valve 134 can be a passive valve that opens and closes based on a pressure differential between the auxiliary flow duct 130 and the engine inlet duct 122. For example, the diverter valve 134 can be spring-loaded to be normally closed for diverting boundary layer flow during cruise operation. During high thrust, low speed and/or static operation, the increased air flow demand by the engine 111 can provide a vacuum that overcomes the spring force keeping the diverter valve 134 closed, and can open the diverter valve 134 to initiate the flow of auxiliary air through the auxiliary flow duct 130. In an alternate embodiment, the diverter valve 134 can be activated by an actuator 143 to move between the first position and the second position. In still a further aspect of this embodiment, the diverter valve 134 can be activated either automatically (for example, by a computer that is coupled to sensors measuring aircraft forward speed and engine rpm), or alternatively, the diverter valve 134 can be activated by an input from the pilot or other operator.

Figure 5:
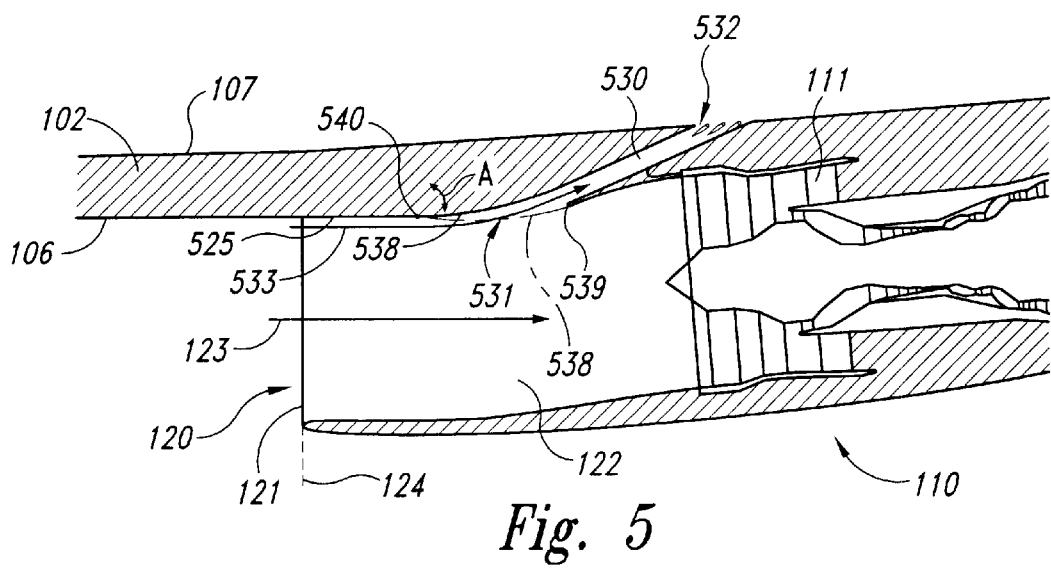
FIG. 5 is a partially schematic, cross-sectional side view of a propulsion system having an auxiliary flow duct in accordance with another embodiment of the invention.

FIG. 5 is a partially schematic, cross-sectional side view of a propulsion system 110 having an inlet 120 and an auxiliary flow duct 530 in accordance with another embodiment of the invention. In one aspect of this embodiment, the inlet 120 can be positioned proximate to the wing lower surface 106. Alternatively, the inlet 120 can be positioned proximate to another aircraft surface, such as the wing upper surface 107. In either embodiment, the auxiliary flow duct 530 can have a first opening 531 and a second opening 532. The first opening 531 can be defined, at least in part, by a duct leading edge 539 that is flush with, or recessed from, an internal surface of the engine inlet duct 122. For example, when the inlet 120 is mounted proximate to the wing lower surface 106, the duct leading edge 539 can be approximately flush with, or recessed upwardly from, an inlet upper surface 525. The duct leading edge 539 can also be recessed rearwardly from an inlet hilite plane 124, defined by the inlet aperture 121.

The inlet 120 can further include a first diverter valve 538 positioned proximate to the first opening 531 of the auxiliary flow duct 530. In one aspect of this embodiment, the first diverter valve 538 can be pivotable relative to the inlet upper surface 525 about a pivot point 540, as indicated by arrow A. Accordingly, the first diverter valve 538 can move from a first position (shown in solid lines in FIG. 5) to a second position (shown in dashed lines in FIG. 5 and described in greater detail below with reference to FIG. 6). In one embodiment, the first diverter valve 538 can be in the first position during cruise operation to bypass diverted air flow 533 (for example, boundary layer air) through the auxiliary flow duct 530 to the second opening 532. The flow through the second opening 532 can be controlled by another valve (such as a plurality of louvers) as described in greater detail below with reference to FIG. 7. The first diverter valve 538 can be moved to the second position during other conditions, such as static and low speed, high thrust conditions, as described below with reference to FIG. 6 to provide increased air flow to the engine 111 without diverting the air flow.

Figure 6:
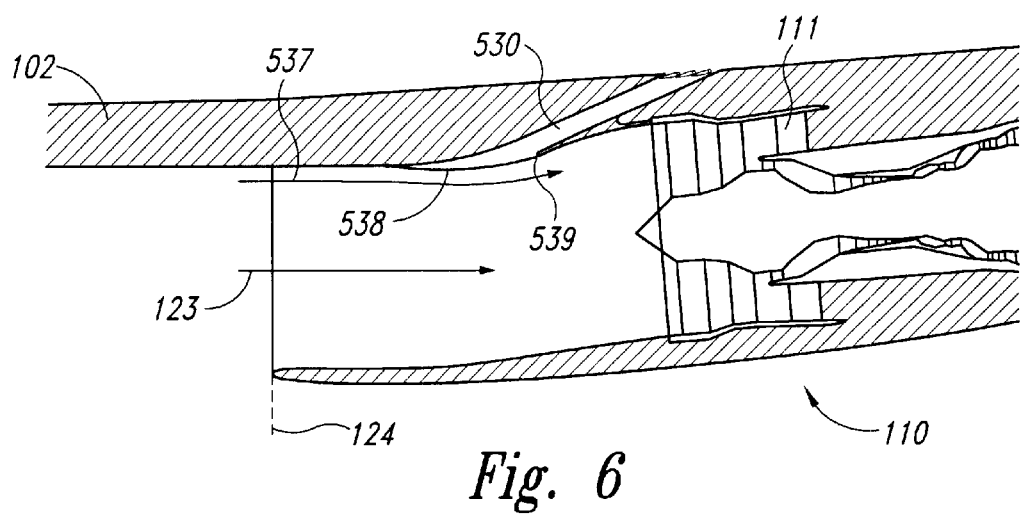
FIG. 6 is a partially schematic, cross-sectional side view of the propulsion system shown in FIG. 5 providing auxiliary flow in accordance with an embodiment of the invention.

FIG. 6 illustrates an embodiment of the propulsion system 110 described above with reference to FIG. 5 with the first diverter valve 538 in its second position. In one aspect of this embodiment, the first diverter valve 538 is positioned approximately flush with the duct leading edge 539. When the first diverter valve 538 is in its second position, auxiliary air flow 537, which would otherwise be diverted through the auxiliary flow duct 530, is instead provided to the engine 111. Accordingly, the propulsion system 110 can provide increased air flow to the engine 111 when the first diverter valve 538 is in its second position.

One feature of an embodiment of the auxiliary flow duct 530 described above with reference to FIGS. 5 and 6 is that the duct leading edge 539 can be recessed rearwardly from the inlet hilite plane 124, and can be recessed upwardly from the inlet upper surface 525. Accordingly, the duct leading edge 539 can be hidden or partially hidden behind the wing 102. In one aspect of this embodiment, recessing the duct leading edge 539 can reduce the likelihood for ice to build up on the duct leading edge 539 (during flight in icing conditions), and accordingly, the engine 111 can be less likely ingest potentially damaging ice particles released from the duct leading edge 539.

Figure 7:
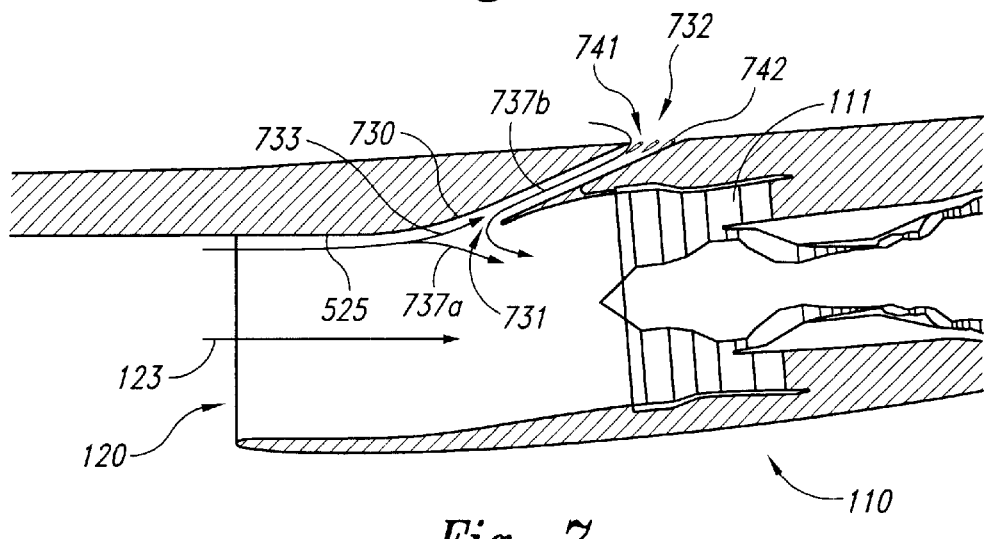
FIG. 7 is a partially schematic, cross-sectional side view of a propulsion system having an auxiliary inlet with a valve in accordance with another embodiment of the invention.

FIG. 7 is a partially schematic, cross-sectional side view of a propulsion system 110 having an auxiliary flow duct 730 in accordance with another embodiment of the invention. In one aspect of this embodiment, the auxiliary flow duct 730 can include a first opening 731, a second opening 732, and a second diverter valve 741 positioned at or near the second opening 732. In one embodiment, the second diverter valve 741 can include louvers 742 and in other embodiments, the second diverter valve 741 can have other valve arrangements. In any of these embodiments, the auxiliary flow duct 730 can form a continuous, non-movable surface with the inlet upper surface 525. Accordingly, the first diverter valve 538 (FIGS. 5 and 6) can be eliminated.

During high speed and/or cruise operation, the second diverter valve 741 can be opened. Accordingly, diverted air flow 733 (such as boundary layer flow) can enter the auxiliary flow duct 730 through the first opening 731 and exit the auxiliary flow duct 730 through the second opening 732. During low speed and/or static operation, the second diverter valve 741 can be closed. Accordingly, auxiliary air flow 737a which would otherwise be diverted through the auxiliary flow duct 730 can instead be provided to the engine 111. Alternatively, the second diverter valve 741 can be opened during low speed and static operation to allow additional auxiliary air flow 737b to enter the auxiliary flow duct 730 through the second opening 732 and flow to the engine 111 via the first opening 731. In either of these embodiments, the inlet 120 and the auxiliary flow duct 730 can provide increased air flow to the engine 111 during some phases of operation and can divert boundary layer air away from the engine 111 during other phases.

Figure 8:
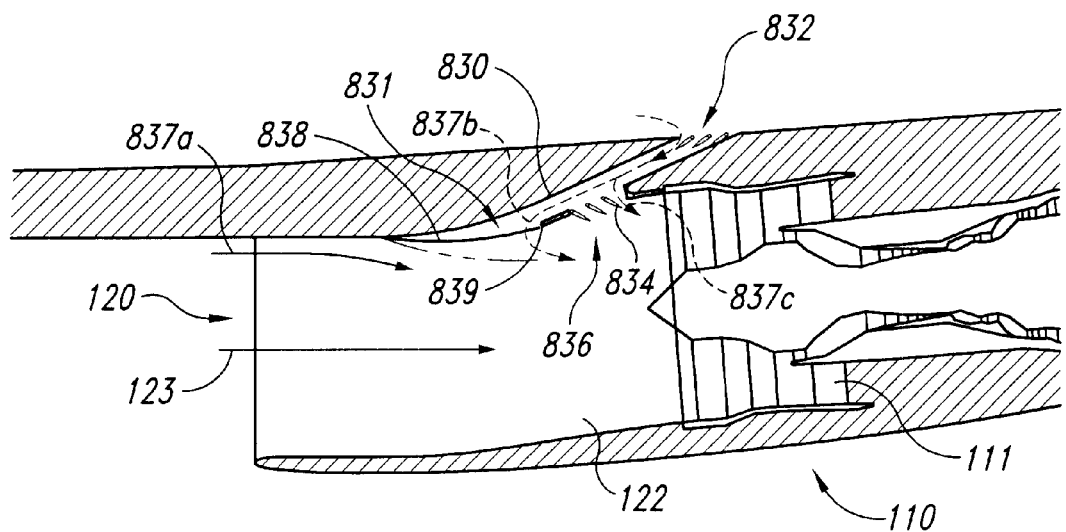
FIG. 8 is a partially schematic, cross-sectional side view of a propulsion system having an auxiliary flow duct with an additional opening into an engine inlet duct in accordance with another embodiment of the invention.

FIG. 8 is a partially schematic, cross-sectional side view of a propulsion system 110 having an inlet 120 and an auxiliary flow duct 830 that operate in accordance with another embodiment of the invention. In one aspect of this embodiment, the auxiliary flow duct 830 can include a first opening 831, a second opening 832 and a first diverter valve 838 positioned proximate to the first opening 831 and movable between a first position (generally similar to that shown in FIG. 5) and a second position (shown in solid lines in FIG. 8 and generally similar to that described above with reference to FIG. 6).

When the first diverter valve 838 is in its second position, auxiliary air flow 837a which would otherwise be diverted through the auxiliary flow duct 830 can instead be provided to the engine 111. In a further aspect of this embodiment, the first diverter valve 838 can be moved to a third position (shown in dashed lines in FIG. 8) to allow additional auxiliary air flow 837b to enter through the second opening 832 of the auxiliary flow duct 830 and pass into the inlet duct 122 via the first opening 831 and around a duct leading edge 839. In still a further aspect of this embodiment, the auxiliary flow duct 830 can include a third opening 836 that can selectively provide additional auxiliary air flow 837c between the auxiliary flow duct 830 and the engine inlet duct 122. A third diverter valve 834 can be positioned in the third opening 836 to control air flow through the third opening 836. In one embodiment, the third diverter valve 834 can include louvers and in other embodiments the third diverter valve 834 can include other devices. In any of these embodiments, the third diverter valve 834 can be closed (for example, during cruise operation) to divert boundary layer through the auxiliary flow duct 830, and then opened (as shown in FIG. 8) to allow additional auxiliary air flow 837a, b, and/or c to pass to the engine 111.

Figure 9:
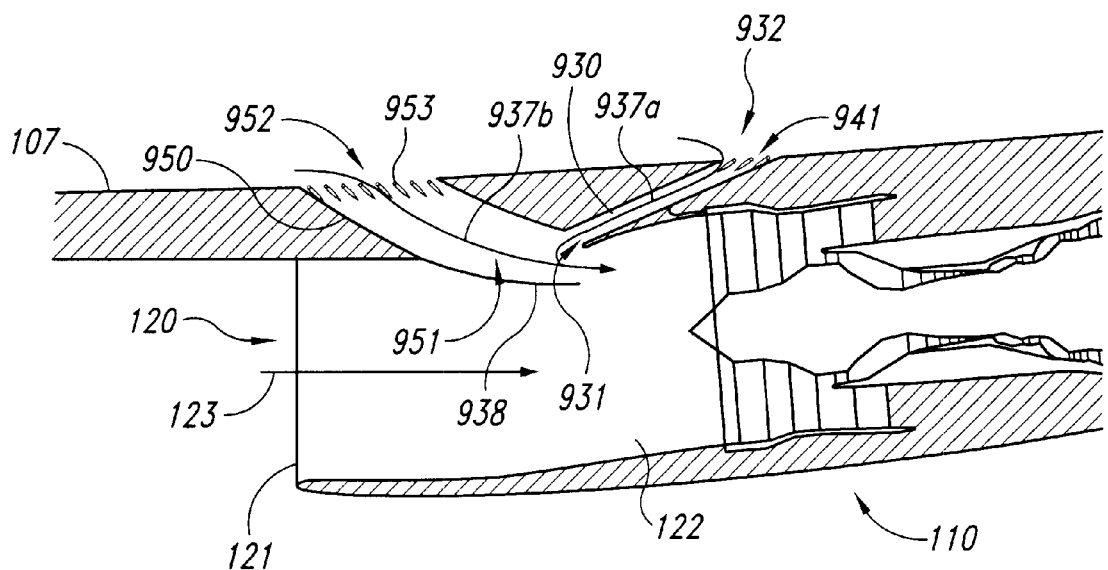
FIG. 9 is a partially schematic, cross-sectional side elevation view of a propulsion system having two auxiliary flow ducts in accordance with another embodiment of the invention.

FIG. 9 is a partially schematic, cross-sectional side view of a propulsion system 110 having an inlet 120 and a first auxiliary flow duct 930 that operates in accordance with yet another embodiment of the invention. In one aspect of this embodiment, the first auxiliary flow duct 930 can include a first opening 931, a second opening 932 and a first diverter valve 938 positioned proximate to the first opening 931 to move between a first, second and third position, generally as described above with reference to FIG. 8. The first auxiliary flow duct 930 can also include a second diverter valve 941 at least proximate to the second opening 932 that operates in a manner generally similar to that described above with reference to FIG. 7.

In a further aspect of this embodiment, the propulsion system 110 can include a second auxiliary flow duct 950 having a first opening 951 positioned to be selectively placed in fluid communication with the engine inlet duct 122, and a second opening 952. In one aspect of this embodiment, the second opening 952 can be positioned at the wing upper surface 107 and can include a fourth valve 953 (such as a plurality of louvers) to control air flow through the second auxiliary flow duct 950. During at least one phase of operation (such as low speed and/or static, high thrust operation), the first diverter valve 938 can be moved to its third position (as shown in FIG. 9) and the second diverter valve 941 and the fourth valve 953 can be opened. Accordingly, a first auxiliary flow 937a can enter the first auxiliary flow duct 930 through the second opening 932, and a second auxiliary flow 937b can enter the second auxiliary flow duct 950 through the second opening 952. Both auxiliary flows 937a and 937b can enter the engine inlet duct 122 by passing adjacent to the second diverter valve 938 to augment the air flow provided to the engine 111 through the inlet aperture 121.

One feature of the foregoing embodiments described above with reference to FIGS. 1–9 is that the same auxiliary flow duct can be used to both divert boundary layer air away from the engine (for example, during cruise operation) and direct auxiliary air to the engine (for example, during low speed and/or static, high thrust operation). An advantage of this arrangement is that it can simplify the propulsion system because a single subsystem can serve both boundary layer diversion and low speed, high thrust auxiliary flow purposes.

From the foregoing, it will be appreciated that specific embodiments of the invention have been described herein for purposes of illustration, but that various modifications may be made without deviating from the spirit and scope of the invention. For example, many of the features described above with reference to certain of the foregoing embodiments may be combined with other features described above with reference to other embodiments. Some or all of the valves described above can be passive valves that open and close based on pressure differentials across the valves, or the valves can be activated based, for example, on commands received from a computer and/or a pilot or other operator. Accordingly, the invention is not limited except as by the appended claims.

We claim:

1. An aircraft propulsion system, comprising:
   an external flow surface having a forward portion;
   an engine inlet positioned at least proximate to the external flow surface and aft of the forward portion, the engine inlet having an aperture positioned at least proximate to the external flow surface;
   an engine inlet duct extending aft from the aperture to an engine location; and
   an auxiliary flow duct positioned at least proximate to the external flow surface, the auxiliary flow duct having a first opening positioned to receive flow from the external flow surface during at least a first portion of an operating schedule of the propulsion system, with flow surfaces of the auxiliary flow duct fixed at the first opening, the auxiliary flow duct further having a second opening spaced apart from the first opening, the auxiliary flow duct being configured to direct air to the engine location during at least a second portion of the operating schedule of the propulsion system.

2. The system of claim 1 wherein the auxiliary flow duct includes a third opening between the first and second openings, the third opening providing fluid communication between the auxiliary flow duct and the engine inlet duct, and wherein the system further comprises a plurality of louvers positioned in the auxiliary flow duct, the louvers being moveable between a closed position and an open position, the louvers generally restricting boundary layer air from passing from the auxiliary flow duct into the engine inlet duct when in the closed position, the louvers allowing air to pass from the auxiliary flow duct into the engine inlet duct during static and low speed operation when the louvers are in the open position, and wherein the louvers are configured to move between the open position and the closed position based on a difference in air pressure between air flow in the auxiliary flow duct and the engine inlet duct.

3. The system of claim 1 wherein the auxiliary flow duct includes a third opening between the first and second openings, the third opening providing fluid communication between the auxiliary flow duct and the engine inlet duct, and wherein the system further comprises a plurality of louvers positioned in the auxiliary flow duct, the louvers being moveable between a closed position and an open position, the louvers generally restricting boundary layer air from passing from the auxiliary flow duct into the engine inlet duct when in the closed position, the louvers allowing air to pass from the auxiliary flow duct into the engine inlet duct when the louvers are in the open position, and wherein the louvers are configured to move between the open position and the closed position based on a difference in air pressure between air flow in the auxiliary flow duct and the engine inlet duct, further wherein the external flow surface is a wing lower surface, and wherein the first opening of the auxiliary flow duct is positioned at least proximate to the wing lower surface, further wherein the second opening of the auxiliary flow duct is positioned proximate to a wing upper surface.

4. The system of claim 1 wherein the external flow surface includes a wing portion.

5. The system of claim 1 wherein the external flow surface is one of a wing lower surface and a wing upper surface.

6. The system of claim 1 wherein the external flow surface is one of a wing lower surface and a wing upper surface, and wherein the first opening of the auxiliary flow duct is positioned at least proximate to the one of the wing lower surface and the wing upper surface, and wherein the second opening of the auxiliary flow duct is positioned proximate to the other of the wing lower surface and the wing upper surface.

7. The system of claim 1 wherein the auxiliary flow duct has a first configuration during cruise operation and the auxiliary flow duct has a second configuration during take-off operation, and wherein the auxiliary flow duct is changeable between the first and second configurations.

8. The system of claim 1 wherein the auxiliary flow duct includes a third opening between the first and second openings, the third opening providing fluid communication between the auxiliary flow duct and the engine inlet duct, and wherein the system further comprises a valve positioned to selectively permit and restrict flow through the third opening.

9. The system of claim 1, further comprising a valve positioned at least proximate to the first opening to control a flow of air through the first opening.

10. The system of claim 1, further comprising a valve positioned at least proximate to the second opening to control a flow of air through the second opening.

11. An aircraft propulsion system, comprising:
a wing portion having wing surfaces including a wing upper surface and a wing lower surface;
an engine inlet positioned at least proximate to at least one of the wing upper surface and the wing lower surface, the engine inlet having an aperture positioned at least proximate to the at least one wing surface;
an engine inlet duct extending aft from the aperture to an engine location; and
an auxiliary flow duct positioned proximate to the at least one wing surface to receive air flowing along the at least one wing surface, the auxiliary flow duct extending through the wing portion to the other wing surface, the auxiliary flow duct having a first opening and a second opening spaced. apart from the first opening, wherein flow surfaces of the auxiliary flow duct fixed at the first opening the second opening being at least proximate to the other wing surface, the auxiliary flow duct being configured to direct flow to the engine location during at least a portion of an operating schedule of the propulsion system.

12. The system of claim 11, further comprising a plurality of louvers positioned in the auxiliary flow duct, the louvers being moveable between a closed position and an open position, the louvers generally restricting boundary layer air from passing from the auxiliary flow duct into the engine inlet duct when in the closed position, the louvers allowing air to pass from the auxiliary flow duct into the engine inlet duct when the louvers are in the open position, and wherein the louvers are configured to move between the open position and the closed position based on a difference in air pressure between air flow in the auxiliary flow duct and the engine inlet duct.

13. The system of claim 11, further comprising:
at least one valve positioned between the auxiliary flow duct and the engine inlet duct, the at least one valve being movable between a first position and a second position with the at least one valve allowing flow to pass the at least one valve from the auxiliary flow duct into the engine inlet duct when the at least one valve is in the open position, and with the at least one valve restricting flow from passing from the auxiliary flow duct into the engine inlet duct when the at least one valve is in the closed position; and
an actuator coupled to the at least one valve to move the at least one valve between the open position and the closed position.

14. The system of claim 11, further comprising at least one valve positioned between the auxiliary flow duct and the engine inlet duct, the at least one valve being movable between a first position and a second position, with the at least one valve allowing flow to pass the at least one valve from the auxiliary flow duct into the engine inlet duct when the at least one valve is in the open position, and with the at least one valve restricting flow from passing from the auxiliary flow duct into the engine inlet duct when the at least one valve is in the closed position.

15. The system of claim 11 wherein the auxiliary flow duct is a first auxiliary flow duct, and wherein the system further comprises a second auxiliary flow duct, the second auxiliary flow duct extending through the wing portion and having a first opening and a second opening spaced apart from the first opening, the second opening being at least proximate to the other wing surface, the second auxiliary flow duct being configured to direct air into the engine inlet duct during at least a portion of the operating schedule of the propulsion system.

16. The system of claim 11 wherein the auxiliary flow duct has a leading edge positioned within engine inlet duct and recessed from the aperture of the engine inlet duct.

17. The system of claim 11 wherein the aperture of the engine inlet defines a hilite plane, and wherein the auxiliary flow duct has a leading edge positioned within the engine inlet duct and recessed from the aperture of the engine inlet.

18. The system of claim 11, further comprising a valve positioned at least proximate to the auxiliary flow duct, the valve being movable between a first position and a second position, the valve generally restricting air from entering the first opening when the valve is in the first position, the valve allowing air to enter the first opening when the valve is in the second position.

19. The system of claim 11 wherein the aperture of the engine inlet defines a hilite plane, and wherein the auxiliary flow duct has a leading edge positioned within the engine inlet duct and recessed from the aperture of the engine inlet duct, and wherein the system further comprises a valve positioned at least proximate to the auxiliary flow duct, the valve being pivotable between a first position and a second position, the valve being offset from the leading edge to allow air to enter the first opening when the valve is in the first position, the valve being at least approximately flush with the leading edge of the auxiliary flow duct to at least restrict air from entering the first opening when the valve is in the second position.

20. The system of claim 11 wherein the aperture of the engine inlet defines a hilite plane, and wherein the auxiliary flow duct has a leading edge positioned within the engine inlet duct and recessed in an aft direction from the hilite plane, and wherein the system further comprises a valve positioned at least proximate to the auxiliary flow duct, the valve being pivotable among a first position, a second position and a third position, the valve being offset from the leading edge in a first direction to allow air to enter the first opening when the valve is in the first position, the valve being at least approximately flush with the leading edge of the auxiliary flow duct to at least restrict air from entering the first opening when the valve is in the second position, the valve being offset from the leading edge in a second direction opposite the first direction to allow air to pass from the auxiliary flow duct into the engine inlet duct when the valve is in the third position.

21. The system of claim 11 wherein the aperture is positioned proximate to the wing lower surface.

22. The system of claim 11 wherein the aperture is positioned proximate to the wing lower surface and wherein the engine inlet duct has a generally upwardly curving s-shape as it extends aft from the aperture, with at least a portion of the engine inlet duct hidden by the wing.

23. An aircraft propulsion system, comprising:
an external flow surface having a forward portion;
an engine inlet positioned at least proximate to the external flow surface, the inlet having an aperture positioned at least proximate to the external flow surface;
an engine inlet duct extending aft from the aperture to an engine location; and
an auxiliary flow duct positioned at least proximate to external flow surface, the auxiliary flow duct having a leading edge positioned at least approximately flush with the aperture, the auxiliary flow duct having a first opening and a second opening spaced apart from the first opening, the first opening being positioned to receive flow from the external flow surface during at least a first portion of an operating schedule of the propulsion system, the auxiliary flow duct being configured to direct air to the engine location during at least a second portion of the operating schedule of the propulsion system.

24. The system of claim 23, further comprising a plurality of louvers positioned in the auxiliary flow duct, the louvers being moveable between a closed position and an open position, the louvers generally restricting boundary layer air from passing from the auxiliary flow duct into the engine inlet duct when in the closed position, the louvers allowing air to pass from the auxiliary flow duct into the engine inlet duct when the louvers are in the open position, and wherein the louvers are configured to move between the open position and the closed position based on a difference in air pressure between air flow in the auxiliary flow duct and air flow in the engine inlet duct.

25. The system of claim 23, further comprising at least one valve positioned between the auxiliary flow duct and the engine inlet duct, the at least one valve being movable between a first position and a second position with the at least one valve allowing flow to pass the at least one valve from the auxiliary flow duct into the engine inlet duct when the at least one valve is in the open position, and with the at least one valve restricting flow from passing from the auxiliary flow duct into the engine inlet duct when the at least one valve is in the closed position.

26. The system of claim 23 wherein the external surface is one of a lower surface and an upper surface of a wing portion, and wherein the auxiliary flow duct is a first auxiliary flow duct, and wherein the system further comprises a second auxiliary flow duct, the second auxiliary flow duct extending through the wing portion and having a first opening and a second opening spaced apart from the first opening, the second opening being at least proximate to the other of the lower surface and the upper surface, the second auxiliary flow duct being configured to direct air to the engine location during at least a portion of the operating schedule of the propulsion system.

27. The system of claim 23, further comprising a valve positioned at least proximate to the auxiliary flow duct, the valve being pivotable between a first position and a second position, the valve being offset from the leading edge to allow air to enter the first opening when the valve is in the first position, the valve being at least approximately flush with the leading edge of the auxiliary flow duct to at least restrict air from entering the first opening when the valve is in the second position.

28. The system of claim 23, further comprising a valve positioned at least proximate to the auxiliary flow duct, the valve being pivotable among a first position, a second position and a third position, the valve being offset from the leading edge in a first direction to allow air to enter the first opening when the valve is in the first position, the valve being at least approximately flush with the leading edge of the auxiliary flow duct to at least restrict air from entering the first opening when the valve is in the second position, the valve being offset from the leading edge in a second direction opposite the first direction to allow air to pass from the auxiliary flow duct into the engine inlet duct when the valve is in the third position.

29. An aircraft propulsion system, comprising:
an external flow surface having a forward portion;
an engine inlet positioned at least proximate to external flow surface and aft of the forward portion, the engine inlet having an aperture positioned at least proximate to the external flow surface;
an engine inlet duct extending aft from the aperture to an engine location;
an auxiliary flow duct positioned proximate to the external flow surface to receive air flowing along the external flow surface during at least a first portion of an operating schedule of the propulsion system, the auxiliary flow duct having a first opening and a second opening spaced apart from the first opening, flow surfaces at the auxiliary flow duct being fixed at the first opening; and
a valve positioned at least proximate to the auxiliary flow duct, the valve being movable between a first position and a second position with the valve directing air passing adjacent to the valve to the engine location when the valve is in the first position, and with the valve directing air passing adjacent to the valve through the auxiliary flow duct when the valve is in the second position.

30. The system of claim 29 wherein the auxiliary flow duct includes a third opening between the first and second openings, the third opening providing fluid communication between the auxiliary flow duct and the engine inlet duct, and wherein the valve is positioned proximate to the third opening to control air flow through the third opening.

31. The system of claim 29 wherein the valve is positioned proximate to the first opening of the auxiliary flow duct to direct flow into the auxiliary flow duct when the valve is in the first position and direct flow away from the auxiliary flow duct when the valve is in the second position.

32. The system of claim 29 wherein the valve is a first valve positioned proximate to the first opening of the auxiliary flow duct to direct flow into the auxiliary flow duct when the valve is in the first position and direct flow away from the auxiliary flow duct when the valve is in the second position, and wherein the auxiliary flow duct includes a third opening between the first and second openings, the third opening providing fluid communication between the auxiliary flow duct and the engine inlet duct, and wherein the system further comprises a second valve positioned proximate to the third opening to control air flow through the third opening.

33. The system of claim 29 wherein the valve includes a plurality of louvers.

34. The system of claim 29, further comprising an actuator coupled to the valve to move the valve between the first and second positions.

35. The system of claim 29 wherein the external flow surface is one of a lower surface and an upper surface of a wing portion, and wherein the auxiliary flow duct is a first auxiliary flow duct, and wherein the system further comprises a second auxiliary flow duct, the second auxiliary flow duct extending through the wing portion and having a first opening and a second opening spaced apart from the first opening, the second opening being at least proximate to the other of the lower surface and the upper surface, the second auxiliary flow duct being configured to direct air to the engine location during at least a portion of the operating schedule of the propulsion system.

36. The system of claim 29 wherein the aperture of the engine inlet defines a hilite plane, and wherein the auxiliary flow duct has a leading edge positioned within the engine inlet duct and recessed aft from the hilite plane, and wherein the valve is pivotable among a first position, a second position and a third position, the valve being offset from the leading edge in a first direction to allow air to enter the first opening when the valve is in the first position, the valve being at least approximately flush with the leading edge of the auxiliary flow duct to at least restrict air from entering the first opening when the valve is in the second position, the valve being offset from the leading edge in a second direction opposite the first direction to allow air to pass from the auxiliary flow duct into the engine inlet duct when the valve is in the third position.

37. An aircraft propulsion system, comprising:
 a wing portion having wing surfaces including a wing upper surface and a wing lower surface;
 an engine inlet positioned at least proximate to at least one of the wing upper surface and the wing lower surface, the engine inlet having an aperture positioned at least proximate to the at least one wing surface;
 an engine inlet duct extending aft from the aperture to an engine location;
 an auxiliary flow duct positioned proximate to the at least one wing surface to receive air flowing along the at least one wing surface, the auxiliary flow duct extending through the wing portion to the other wing surface, the auxiliary flow duct having a first opening and a second opening spaced apart from the first opening, flow surfaces of the auxiliary flow duct being fixed at the first opening, the second opening being at least proximate to the other wing surface, the auxiliary flow duct being configured to direct air to the engine location during at least a portion of an operating schedule of the propulsion system; and
 at least one valve positioned at least proximate to the second opening of the auxiliary flow duct, the at least one valve being movable between a first position and a second position with the at least one valve at least restricting flow through the second opening when in the first position, the at least one valve allowing flow through the second opening when in the second position.

38. The system of claim 37 wherein the at least one valve includes a plurality of louvers.

39. The system of claim 37 wherein the auxiliary flow duct is a first auxiliary flow duct and wherein the system further comprises a second auxiliary flow duct, the second auxiliary flow duct extending through the wing portion and having a first opening and a second opening spaced apart from the first opening, the second opening being at least proximate to the other wing surface, the second auxiliary flow duct being configured to be in fluid communication with the engine inlet duct during at least a portion of the operating schedule of the propulsion system.

40. The system of claim 37 wherein the aperture of the engine inlet defines a hilite plane, and wherein the auxiliary flow duct has a leading edge positioned within the engine inlet duct and recessed from the aperture of the engine inlet duct.

41. The system of claim 37 wherein the aperture of the engine inlet defines a hilite plane, and wherein the auxiliary flow duct has a leading edge positioned within the engine inlet duct and recessed aft from the hilite plane, and wherein the system further comprises a valve positioned at least proximate to the auxiliary flow duct, the valve being pivotable among a first position, a second position and a third position, the valve being offset from the leading edge in a first direction to allow air to enter the first opening when the valve is in the first position, the valve being at least approximately flush with the leading edge of the auxiliary flow duct to at least restrict air from entering the first opening when the valve is in the second position, the valve being offset from the leading edge in a second direction opposite the first direction to allow air to pass from the auxiliary flow duct into the engine inlet duct when the valve is in the third position.

42. An aircraft propulsion system, comprising:
 an external flow surface having a forward portion;
 an engine inlet positioned at least proximate to the external flow surface and aft of the forward portion, the engine inlet having an aperture positioned at least proximate to the external flow surface;
 an engine inlet duct extending aft from the aperture to an engine location;
 a first auxiliary flow duct positioned proximate to the external flow surface to receive air flowing along the external flow surface during at least a first portion of an operating schedule of the propulsion system, the first auxiliary flow duct having a first opening with flow surfaces of the auxiliary flow duct fixed at the first opening, and a second opening spaced apart from the first opening; and a second auxiliary flow duct having a first opening and a second opening spaced apart from the first opening, the first and second auxiliary flow ducts being configured to direct air to the engine location during at least a second portion of the operating schedule.

43. The system of claim 42, further comprising a plurality of louvers positioned in at least one of the first and second auxiliary flow ducts, the louvers being, moveable between a closed position and an open position, the louvers generally restricting boundary layer air from passing from the at least one auxiliary flow duct into the engine inlet duct when in the closed position, the louvers allowing air to pass from the at least one auxiliary flow duct into the engine inlet duct when the louvers are in the open position, and wherein the louvers are configured to move between the open position and the closed position based on a difference in air pressure between air flow in the at least one auxiliary flow duct and air flow in the engine inlet duct.

44. The system of claim 42 wherein the aperture of the engine inlet defines a hilite plane, and wherein the first auxiliary flow duct has a leading edge positioned within the engine inlet duct and recessed from the aperture of the engine inlet duct.

45. The system of claim 42, further comprising a valve positioned at least proximate to at least one of the auxiliary flow ducts, the valve being movable between a first position and a second position, the valve generally restricting air from entering the first opening of the at least one auxiliary flow duct when the valve is in the first position, the valve allowing air to enter the first opening of the at least one auxiliary flow duct when the valve is in the second position.

46. The system of claim 42 wherein the aperture of the engine inlet defines a hilite plane, and wherein the first auxiliary flow duct has a leading edge positioned within the engine inlet duct and recessed in an aft direction from the hilite plane, and wherein the system further comprises a valve positioned at least proximate to the first auxiliary flow duct, the valve being pivotable among a first position, a second position and a third position, the valve being offset from the leading edge in a first direction to allow air to enter the first opening when the valve is in the first position, the valve being at least approximately flush with the leading edge of the first auxiliary flow duct to at least restrict air from entering the first opening when the valve is in the second position, the valve being offset from the leading edge in a second direction opposite the first direction to allow air to pass from both auxiliary flow ducts into the engine inlet duct when the valve is in the third position.

47. An aircraft, comprising:
a fuselage portion;
a wing portion, with at least one of the fuselage portion and the wing portion having an external flow surface with a forward portion;
an engine;
an engine inlet positioned at least proximate to the external flow surface, aft of the forward portion and forward of the engine, the engine inlet having an aperture positioned at least proximate to the external flow surface;
an engine inlet duct extending aft from the aperture to the engine; and
an auxiliary flow duct positioned at least proximate to the external flow surface, the auxiliary flow duct having a first opening positioned to receive flow from the external flow surface during at least a first portion of an operating schedule of the engine, with flow surfaces of the auxiliary flow duct fixed at the first opening, the auxiliary flow duct further having a second opening spaced apart from the first opening, the auxiliary flow duct being configured to direct air to the engine during at least a second portion of the operating schedule of the engine.

48. The system of claim 47 wherein the auxiliary flow duct includes a third opening between the first and second openings, the third opening providing fluid communication between the auxiliary flow duct and the engine inlet duct, and wherein the system further comprises a plurality of louvers positioned in the auxiliary flow duct, the louvers being moveable between a closed position and an open position, the louvers generally restricting boundary layer air from passing from the auxiliary flow duct into the engine inlet duct when in the closed position, the louvers allowing air to pass from the auxiliary flow duct into the engine inlet duct when the louvers are in the open position, and wherein the louvers are configured to move between the open position and the closed position based on a difference in air pressure between air flow in the auxiliary flow duct and air flow in the engine inlet duct.

49. The system of claim 47 wherein the external flow surface is one of a wing lower surface and a wing upper surface.

50. The system of claim 47 wherein the external flow surface is one of a wing lower surface and a wing upper surface, and wherein the first opening of the auxiliary flow duct is positioned at least proximate to the one of the wing lower surface and the wing upper surface, and wherein the second opening of the auxiliary flow duct is positioned proximate to the other of the wing lower surface and the wing upper surface.

51. The system of claim 47 wherein the auxiliary flow duct has a first configuration during cruise operation and the auxiliary flow duct has a second configuration during take-off operation, and wherein the auxiliary flow duct is changeable from the first configuration to the second configuration.

52. The system of claim 47 wherein the auxiliary flow duct includes a third opening between the first and second openings, the third opening providing fluid communication between the auxiliary flow duct and the engine inlet duct, and wherein the system further comprises a valve positioned to selectively permit and restrict flow through the third opening.

53. A method for controlling aircraft airflow, comprising:
directing a first flow of air into an aircraft inlet aperture positioned proximate to an external flow surface of the aircraft and aft of a forward portion of the external flow surface;
directing the first flow through an engine inlet duct to an aircraft engine;
receiving a second flow of air including boundary layer air developed over the external flow surface through a first opening of an auxiliary flow duct, the auxiliary flow duct including flow surfaces fixed at the first opening;
exiting at least a portion of the second flow of air from the auxiliary flow duct through a second opening of the auxiliary flow duct; and
directing a third flow of air into the auxiliary flow duct, then from the auxiliary flow duct to the aircraft engine.

54. The method of claim 53 wherein the external flow surface includes one of a wing lower surface and a wing upper surface and wherein receiving a second flow of air includes receiving boundary layer air developed over the one of the wing lower surface and the wing upper surface.

55. The method of claim 53 wherein the external flow surface includes one of a wing lower surface and a wing upper surface and wherein receiving a second flow of air includes receiving boundary layer air developed over the one of the wing lower surface and the wing upper surface, further wherein exiting the second flow of air includes exiting the second flow of air through a second opening of the auxiliary flow duct positioned proximate to the other of the wing lower surface and the wing upper surface.

56. The method of claim 53 wherein the auxiliary flow duct extends from a wing lower surface to a wing upper surface and wherein exiting the second flow includes exiting the second flow through a second opening proximate to the wing upper surface.

57. The method of claim 53, further comprising moving a valve proximate to the first opening of the auxiliary flow duct from a one position to another position to direct the boundary layer flow into the auxiliary flow duct.

58. The method of claim 53 wherein the auxiliary flow duct includes a third opening spaced apart from the first and second openings and extending between the auxiliary flow duct and the engine inlet duct, and wherein the method further comprises moving a valve positioned proximate to the third opening from a first position to a second position to direct the third flow of air from the auxiliary flow duct into the engine inlet duct.

59. The method of claim 53 wherein the auxiliary flow duct is a first auxiliary flow duct and wherein the aircraft includes a second auxiliary flow duct having a first opening and a second opening spaced apart from the first opening, the second opening being configured to be selectively placed in fluid communication with the engine inlet duct, and wherein the method further includes directing a fourth flow of air through the second auxiliary flow duct to the aircraft engine.

60. The method of claim 53 wherein directing the third flow of air includes directing air during takeoff operation.

61. The method of claim 53 wherein receiving a second flow of air through a first opening of the auxiliary flow duct includes receiving the second flow of air through a first opening that is recessed rearwardly from the aircraft inlet aperture.

62. A method for controlling aircraft airflow, comprising:
directing a first flow of air into an aircraft inlet aperture positioned proximate to one of a lower wing surface and an upper wing surface of the aircraft;
directing the first flow through an engine inlet duct to an aircraft engine;
receiving a second flow of air, including boundary layer air developed over the one wing surface, in a first opening of an auxiliary flow duct, the auxiliary flow duct having a leading edge positioned at least approximately flush with the aircraft inlet aperture;
exiting at least a portion of the second flow of air from the auxiliary flow duct through a duct opening at least proximate to the other wing surface; and
directing a third flow of air into the auxiliary duct, then from the auxiliary flow duct to the aircraft engine.

63. The method of claim 62 wherein the auxiliary flow duct extends from the wing lower surface to the wing upper surface and wherein exiting at least a portion of the second flow includes exiting at least a portion of the second flow through a second opening proximate to the wing upper surface.

64. The method of claim 62, further comprising moving a valve proximate to the first opening of the auxiliary flow duct from a first position to a second position to direct the boundary layer flow into the auxiliary flow duct.

65. The method of claim 62 wherein the auxiliary flow duct includes a third opening spaced apart from the first and second openings and extending between the auxiliary flow duct and the engine inlet duct, and wherein the method further comprises moving a valve positioned proximate to the third opening from a first position to a second position to direct the third flow of air from the auxiliary flow duct in the aircraft engine.

66. The method of claim 62 wherein the auxiliary flow duct is a first auxiliary flow duct and wherein the aircraft includes a second auxiliary flow duct having a first opening and a second opening spaced apart from the first opening, the second opening being configured to be selectively placed in fluid communication with the engine inlet duct, and wherein the method further includes directing a fourth flow of air through the second auxiliary flow duct to the aircraft engine.

67. The method of claim 62 wherein directing the third flow of air includes directing air during takeoff operation.

68. A method for controlling aircraft airflow, comprising:
directing a first flow of air into an aircraft inlet aperture positioned proximate to one of a lower wing surface and an upper wing surface of the aircraft;
directing the first flow through an engine inlet duct to an aircraft engine;
directing a second flow of air, including boundary layer air developed over the one wing surface, into a first opening of an auxiliary flow duct by placing a valve located at least proximate to the auxiliary flow duct in a first position, the auxiliary flow duct including flow surfaces fixed at the first opening;
exiting at least a portion of the second flow of air from the auxiliary flow duct through a second opening at least proximate to the other wing surface; and
directing a third flow of air to the aircraft engine by placing the valve in a second position.

69. The method of claim 68, further comprising directing the third flow of air into the auxiliary flow duct, then from the auxiliary flow duct into the engine inlet duct, and then from the engine inlet duct to the aircraft engine.

70. The method of claim 68, further comprising pivoting the valve from the first position to the second position.

71. The method of claim 68 wherein the auxiliary flow duct extends from the lower wing surface to the upper wing surface and wherein exiting at least a portion of the second flow includes exiting at least a portion of the second flow through a second opening proximate to the upper wing surface.

72. The method of claim 68 wherein the auxiliary flow duct includes a third opening spaced apart from the first and second openings and extending between the auxiliary flow duct and the engine inlet duct, and wherein the valve is a first valve, and wherein the method further comprises moving a second valve positioned proximate to the third opening from a first position to a second position to direct the third flow of air from the auxiliary flow duct into the engine inlet duct.

73. The method of claim 68 wherein the auxiliary flow duct is a first auxiliary flow duct and wherein the aircraft includes a second auxiliary flow duct having a first opening and a second opening spaced apart from the first opening, the second opening being in fluid communication with the engine inlet duct, and wherein the method further includes directing a fourth flow of air through the second auxiliary flow duct and into the engine inlet duct.

74. The method of claim 68 wherein directing the third flow of air includes directing the third flow of air during takeoff operation.

75. The method of claim 68 wherein receiving a second flow of air through a first opening of the auxiliary flow duct includes receiving the second flow of air through a first opening that is recessed rearwardly from the aircraft inlet aperture.

76. A method for controlling aircraft airflow, comprising:

directing a first flow of air into an aircraft inlet aperture positioned proximate to one of a lower wing surface and an upper wing surface of the aircraft;

directing the first flow through an engine inlet duct to an aircraft engine;

receiving in an auxiliary flow duct a second flow of air including boundary layer air developed over the one wing surface, the auxiliary flow duct having a first opening, a second opening proximate to the other wing surface and a third opening between the first and second openings, the auxiliary flow duct including flow surfaces fixed at the the first opening;

exiting the second flow of air from the auxiliary flow duct through the second opening at least proximate to the other wing surface; and directing a third flow of air into the auxiliary duct, then from the auxiliary duct into the engine inlet duct through the third opening, and then from the engine inlet duct to the aircraft engine.

77. The method of claim 76 wherein the auxiliary flow duct is a first auxiliary flow duct and wherein the aircraft includes a second auxiliary flow duct having a first opening and a second opening spaced apart from the first opening, the second opening being in fluid communication with the engine inlet duct, and wherein the method further includes directing a fourth flow of air through the second auxiliary flow duct and into the engine inlet duct.

78. The method of claim 76 wherein directing the third flow of air includes directing the third flow of air during takeoff operation.

79. The method of claim 76 wherein receiving a second flow of air through a first opening of the auxiliary flow duct includes receiving the second flow of air through a first opening that is recessed rearwardly from the aircraft inlet aperture.

80. A method for controlling aircraft airflow, comprising:

directing a first flow of air into an aircraft inlet aperture positioned proximate to one of a lower wing surface and an upper wing surface of the aircraft;

directing the first flow through an engine inlet duct to an aircraft engine;

receiving a second flow of air including boundary layer air developed over the one wing surface in a first opening of a first auxiliary flow duct, the first auxiliary flow duct having flow surfaces fixed at the first opening;

exiting at least a portion of the second flow of air from the first auxiliary flow duct through a second opening at least proximate to the other wing surface;

directing a third flow of air into the first auxiliary duct, then from the first auxiliary duct into the engine inlet duct, and then from the engine inlet duct to the aircraft engine; and directing a fourth flow of air from the other wing surface into a second auxiliary duct, then from the second auxiliary duct into the engine inlet duct, and then from the engine inlet duct to the aircraft engine.

81. The method of claim 80 wherein directing the third flow of air includes directing the third flow of air during takeoff operation.

82. The method of claim 80 wherein receiving a second flow of air through a first opening of the first auxiliary flow duct includes receiving the second flow of air through a first opening that is recessed rearwardly from the aircraft inlet aperture.

83. An aircraft propulsion system, comprising:

an external flow surface having a forward portion;

an engine inlet positioned at least proximate to the external flow surface and aft of the forward portion, the engine inlet having an aperture positioned at least proximate to the external flow surface;

an engine inlet duct extending aft from the aperture to an engine location, the engine inlet duct having an at least approximately fixed cross-sectional area; and an auxiliary flow duct positioned at least proximate to the external flow surface, the auxiliary flow duct having a first opening positioned to receive flow from the external flow surface during at least a first portion of an operating schedule of the propulsion system, the auxiliary flow duct further having a second opening spaced apart from the first opening, the auxiliary flow duct being configured to direct air to the engine location during at least a second portion of the operating schedule of the propulsion system.

* * * * *